United States Patent
Otsuni et al.

(10) Patent No.: US 6,615,443 B2
(45) Date of Patent: Sep. 9, 2003

(54) STALL CONVERTER FOR SINGLE ENGINE SWEEPER

(75) Inventors: Charles Philip Otsuni, Melville, NY (US); John Charles Otsuni, Melville, NY (US)

(73) Assignee: Mohawk Milling & Sweeping Corp., Melville, NY (US)

( * ) Notice: Subject to any disclaimer, the term of this patent is extended or adjusted under 35 U.S.C. 154(b) by 0 days.

(21) Appl. No.: 10/027,525

(22) Filed: Dec. 28, 2001

(65) Prior Publication Data

US 2002/0043420 A1 Apr. 18, 2002

Related U.S. Application Data

(60) Provisional application No. 60/281,335, filed on Apr. 4, 2001.

(51) Int. Cl.$^7$ .......................... E01H 1/08; B60K 26/00; F16D 33/00
(52) U.S. Cl. .......................... 15/340.4; 15/320; 15/78; 15/82; 15/87; 180/306; 180/307; 180/53.4; 60/330
(58) Field of Search ................. 180/305, 306, 180/307, 53.4, 333, 336; 60/330, 364, 365; 15/82, 87, 78, 340.1, 340.3, 340.4, 320

(56) References Cited

U.S. PATENT DOCUMENTS

| | | | | |
|---|---|---|---|---|
| 2,467,077 A | * | 4/1949 | Brunken | 123/561 |
| 3,186,021 A | * | 6/1965 | Krier et al. | 15/340.4 |
| 3,636,580 A | | 1/1972 | Woedwortz | 15/84 |
| 3,724,583 A | * | 4/1973 | Caldwell | 180/307 |
| 3,785,154 A | * | 1/1974 | Malik | 60/347 |
| 3,852,955 A | * | 12/1974 | Wonn et al. | 60/354 |
| 4,124,329 A | | 11/1978 | Romanov et al. | 415/85 |
| 4,155,222 A | * | 5/1979 | Ahlen | 60/361 |
| 4,180,977 A | * | 1/1980 | Beardmore | 60/342 |
| 4,207,691 A | * | 6/1980 | Hyler et al. | 37/413 |
| 4,355,509 A | | 10/1982 | Falkerson | 180/307 |
| 4,553,626 A | * | 11/1985 | Kazmierczak et al. | 180/307 |
| 4,554,992 A | * | 11/1985 | Kassai | 180/307 |
| 4,773,119 A | * | 9/1988 | Duthie et al. | 15/340.1 |
| 5,005,356 A | * | 4/1991 | Saunders | 60/330 |
| 5,056,615 A | * | 10/1991 | Duthie et al. | 180/306 |
| 5,120,196 A | * | 6/1992 | By et al. | 416/180 |
| 5,335,750 A | * | 8/1994 | Geringer et al. | 180/307 |
| 5,394,694 A | * | 3/1995 | Doumov et al. | 60/363 |
| 5,419,006 A | * | 5/1995 | Duthie | 15/339 |
| 5,630,286 A | * | 5/1997 | Vanderlinden | 37/227 |
| 5,649,606 A | | 7/1997 | Beberhes | 180/307 |
| 5,810,106 A | | 9/1998 | McCoy | 180/307 |
| 6,073,720 A | | 6/2000 | Vanderlinden | 180/307 |
| 6,164,919 A | | 12/2000 | Vanmoor | 416/243 |
| 6,216,454 B1 | * | 4/2001 | Tsuzuki | 60/362 |
| 6,226,985 B1 | * | 5/2001 | Sasse et al. | 60/365 |
| 6,497,096 B1 | * | 12/2002 | Joo | 60/354 |

FOREIGN PATENT DOCUMENTS

DE 3612968 * 10/1987 .................. 15/320

* cited by examiner

Primary Examiner—Brian L. Johnson
Assistant Examiner—Bridget Avery
(74) Attorney, Agent, or Firm—Alfred M. Walker

(57) ABSTRACT

A street sweeper for cleaning municipal streets and commercial parking lots uses a single engine with a modified torque converter on the automatic transmission. The torque converter is designed to lock up or engage higher than on a standard torque converter. This increases the horsepower and torque output of the engine for driving the sweeping apparatus without propelling the vehicle at speeds too high for the sweeping function. As engine rotational speeds increase further, the modified torque converter engages fully and drives the vehicle at desired road speeds.

12 Claims, 8 Drawing Sheets

Diagram of Power Train for Street Sweeper

Diagram of Power Train for Street Sweeper

STALL CONVERTER FOR SINGLE ENGINE SWEEPER

This application claims the benefit of provisional application Ser. No. 60/281,335, filed Apr. 4, 2001.

FIELD OF THE INVENTION

The present invention relates to single engine vehicles with auxiliary hydraulic systems, such as street sweeper vehicles with rotating brushes or fan/blowers for gathering and collecting sand and other road debris.

BACKGROUND OF THE INVENTION

Street sweeping vehicles, designed with either front or rear wheel drive, use a variety of brush/air configurations and other equipment for gathering up dirt and debris and conveying it to a hopper within the vehicle. These vehicles must be able to creep along at one to five miles per hour while sweeping; they must also be driven in traffic at up to fifty miles per hour to travel between job sites. Most single engine type sweepers employ a torque converter and automatic transmission to drive the vehicle wheels. The same engine also directly drives a hydraulic pump which powers the sweeping accessories and brushes either by air operated or mechanical means. The operation of the cleaning apparatus requires the engine to run at a minimum of about 1200 r.p.m. to provide adequate power to the hydraulic pump. At that rotational speed, the torque converter is fully engaged and even at the low gear range of the transmission, the vehicle brakes must be used constantly to reduce road speed to the required range. This is very wasteful of fuel and reduces the wear life of the brakes.

Several solutions to this problem have been applied. One involves the use of separate engines to drive the sweeping apparatus and the vehicle wheels. This results in increased first cost and maintenance. Another solution using a single engine involves the use of a hydrostatic drive to operate the vehicle wheels. This is expensive and fuel inefficient. Another solution provides an extra-low gear for the transmission; while workable, the enormous power provided to the wheels at sweeping speeds requires much brake force to stop the vehicle due to engine inertia.

Yet another solution disclosed in Vanderlinden (U.S. Pat. No. 6,073,720) uses a dual method of providing power to the differential driving the vehicle wheels. One method is used for sweeping while the standard transmission is used for travel between job sites. This adds cost and complexity.

OBJECTS OF THE INVENTION

It is therefore an object of the present invention to provide a single engine vehicle, such as a street sweeper with accessory rotating brushes and or fan/blower operated by an auxiliary hydraulic system, with the ability to increase engine RPM's from a normal idle without increasing forward propulsion while the automatic transmission is in a forward advancing gear.

It is also an object of the present invention to provide a street sweeper vehicle which can effectively and vigorously rotate the street sweeping brushes/fan while maintaining the vehicle's forward advance at a safe, low speed.

It is yet an object of the present invention to increase the engine RPM's to a desired level for satisfactory operation of the accessory street sweeping brushes/fan while slowing down the flow of fluid through the vehicle's transmission.

It is yet another object of the present invention to maximize engine use while reducing heat and raising the overall efficiency of the street sweeper vehicle.

It is also an object of the present invention to improve over the disadvantages of prior art street sweeper vehicles.

SUMMARY OF THE INVENTION

In keeping with these objects and others which may become apparent, the present invention provides a street sweeper vehicle by changing the torque converter used in an automatic transmission for light and heavy duty vehicles.

To overcome the shortcomings of prior art street sweepers, the present invention uses a single engine with a modified torque converter on the automatic transmission.

The torque converter of the street sweeper vehicle is modified by changing the structure and orientation angle of the internal fluid flow directional vanes, which causes the vehicle's lock-up stall pressure to occur at higher than normal RPM's.

The modified torque converter is designed to lock up or engage at approximately 1000 r.p.m. higher than on a standard torque converter. This will increase the horsepower and torque output of the engine for driving the sweeping apparatus without propelling the vehicle at speeds too high for the sweeping function. As engine rotational speeds increase further, the modified torque converter will engage fully and drive the vehicle at desired road speeds.

BRIEF DESCRIPTION OF THE DRAWINGS

The present invention can best be understood in conjunction with the accompanying drawings. It is noted that the invention is not limited to the precise embodiments shown in drawings, in which.

DETAILED DESCRIPTION OF THE INVENTION

Figure 1:
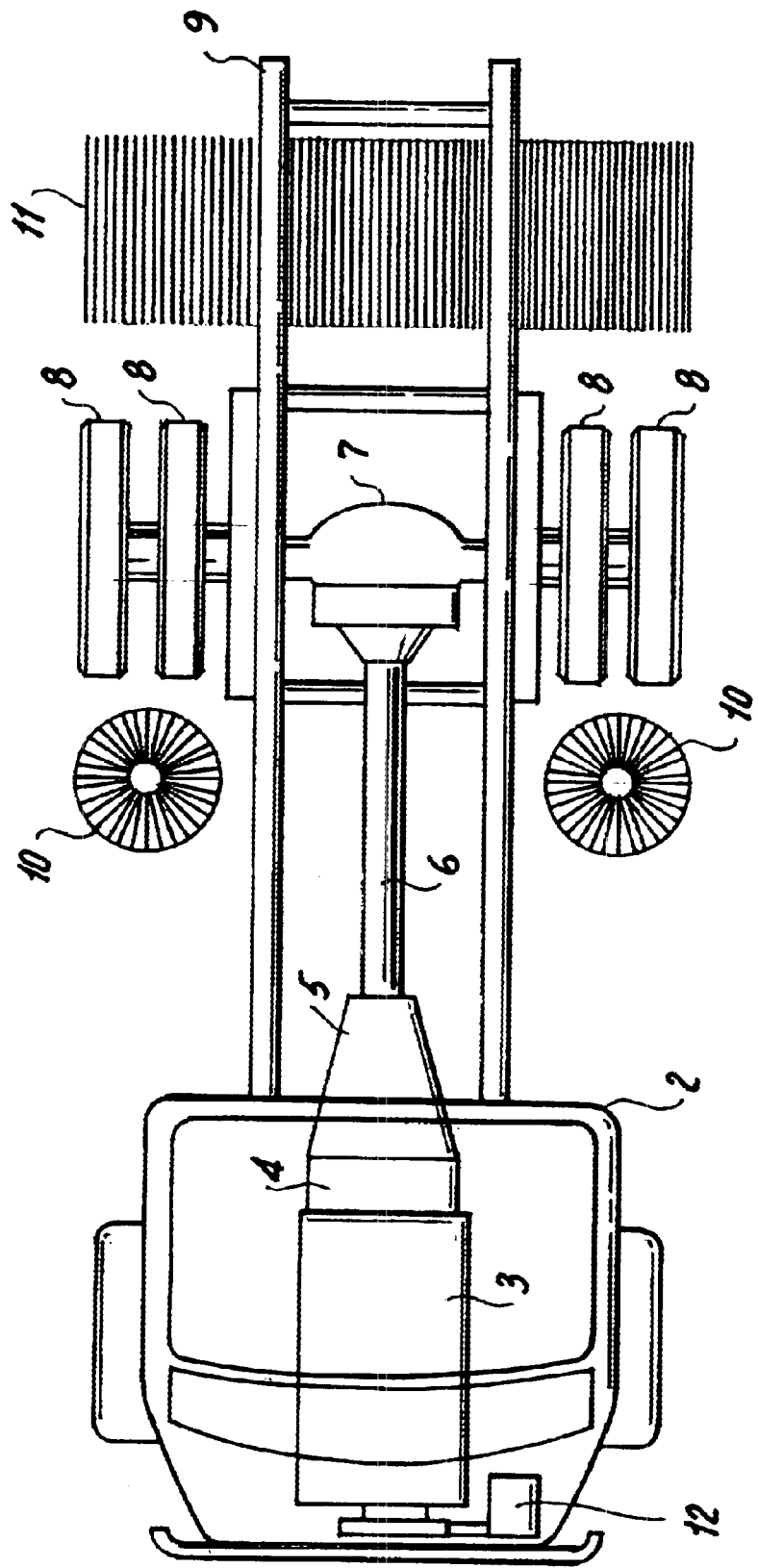
FIG. 1 is a Top plan view of a street sweeper of this invention.

FIG. 1 is an illustration of the major components of a street sweeper 1 that can be used for cleaning streets, roads, highways, construction sites, parking lots, etc. Although a rear wheel drive configuration is shown, the invention can be applied as well to front wheel drive sweepers.

For example, FIG. 1 shows that frame 9 and cab outline 2 are typical truck components. Engine 3 drives side brushes 10, rear brush 11 as well as other accessories (not shown) through the output of hydraulic pump 12 which is directly driven from the engine crankshaft by a power take-off. Engine 3 also drives modified torque converter 4 which then drives automatic transmission 5, drive shaft 6 and differential 7. The drive axle with wheels 8 is attached to differential 7.

Figure 2:
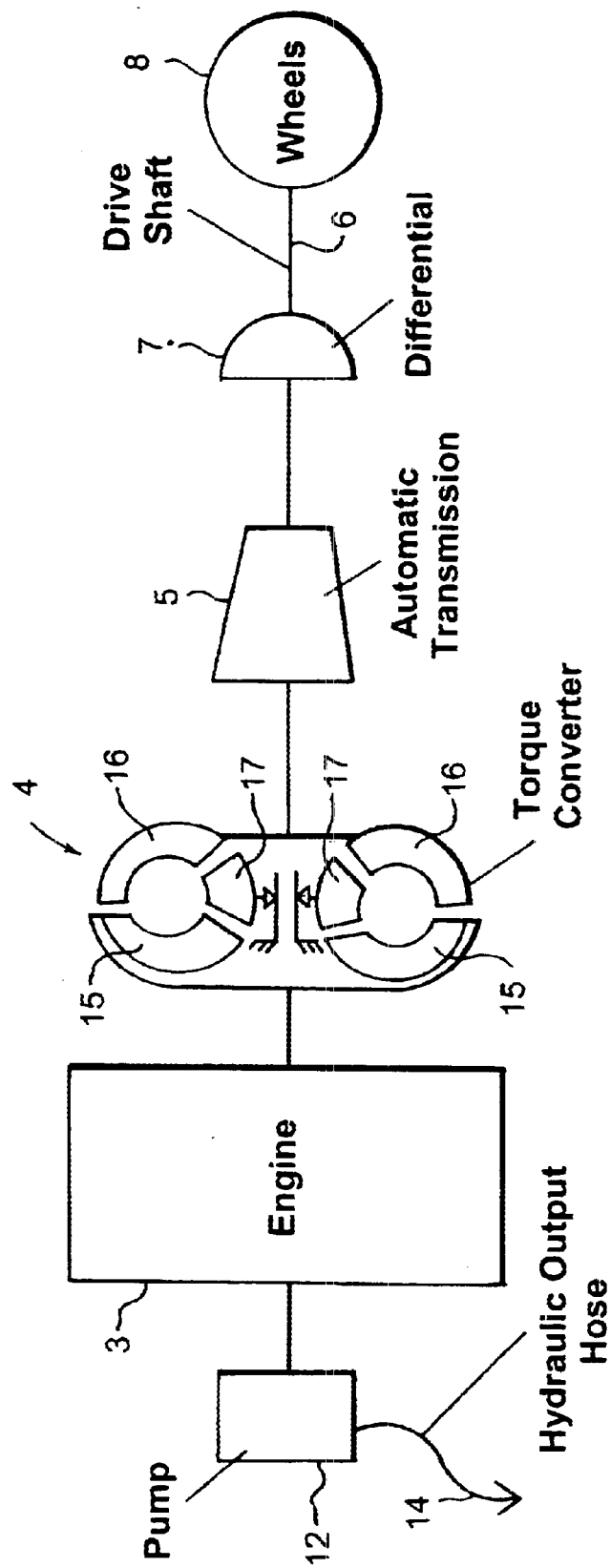
FIG. 2 is a Power flow block diagram for the street sweeper thereof.

FIG. 2 is a block diagram of the drive train of the present invention. Engine 3 is shown directly driving hydraulic pump 12 with output hydraulic hose 14 to the sweeping apparatus; this requires an engine speed of at least 1500 r.p.m. The three main components of torque converter 4 are the impeller 15 driven by engine 3, the stator 17 which redirects transmission oil pressurized by impeller 15 and turbine 16 which is driven by transmission oil flow and drives automatic transmission 5.

This invention modifies the blades in impeller 15 and adds a baffle plate to stator 17 to increase the maximum engine speed at which turbine 16 can be held stationary; this is commonly known as the rated stall RPM or the stall torque ratio. In this way, torque converter 4 is made to slip greatly at an engine speed which adequately drives hydraulic pump 12 for powering the sweeping apparatus. Thus, turbine 16 is spinning at a much slower speed than engine 3 while driving the input of transmission 5. Therefore, low sweeping speeds are maintained by the vehicle wheels, and only low power is transmitted for driving. This means that the brakes can easily stop sweeper 1.

Figure 3:
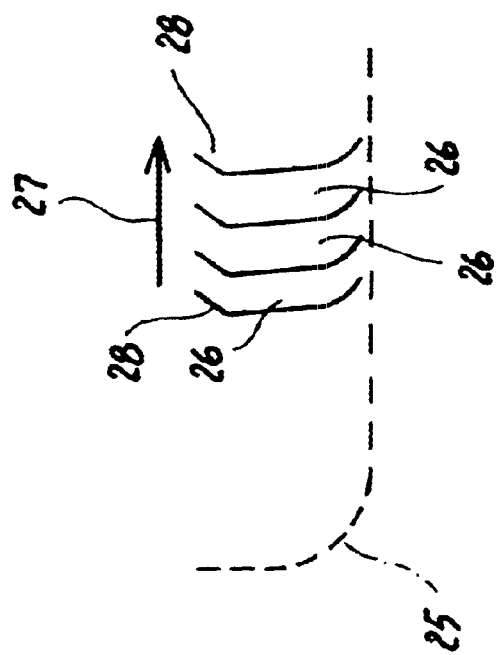
FIG. 3 is a Edge view of contour of conventional prior art impeller blades.

FIG. 3 shows the contour of impeller blades 26 within impeller housing 25. For a normal torque converter (as shown) the blade tips 28 are slightly angled in the direction of rotation 27.

Figure 4:
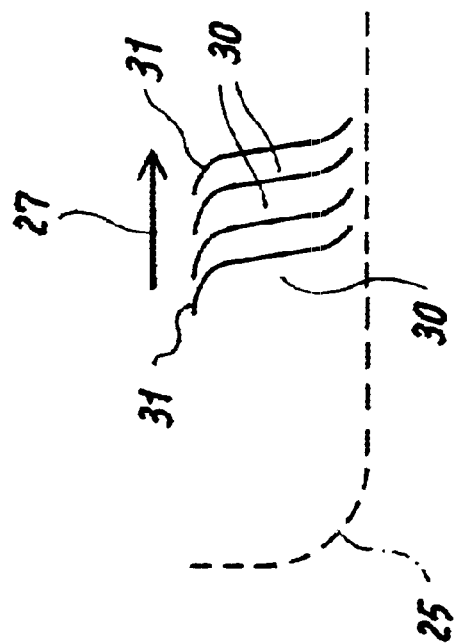
FIG. 4 is a Edge view of contour of modified impeller blades of this invention.

FIG. 4 shows one modification of this invention which re-curves radially positioned impeller blades 30, so that the blade tips 31 are now facing into and opposite impeller rotation 27. This reduces oil velocity and flow to react on turbine 16 thereby reducing torque transferred, and increasing stall torque ratio.

Figure 5:
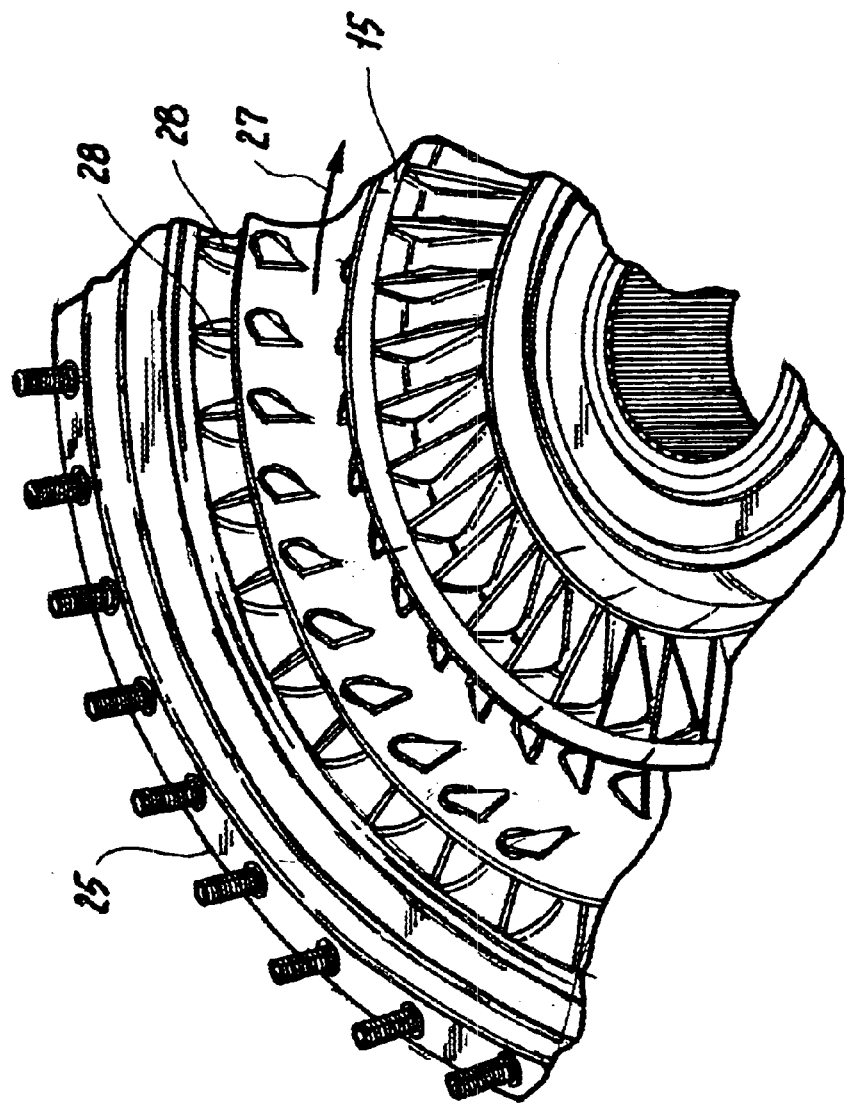
FIG. 5 is a Perspective top view of a conventional prior art impeller detail.
Figure 6:
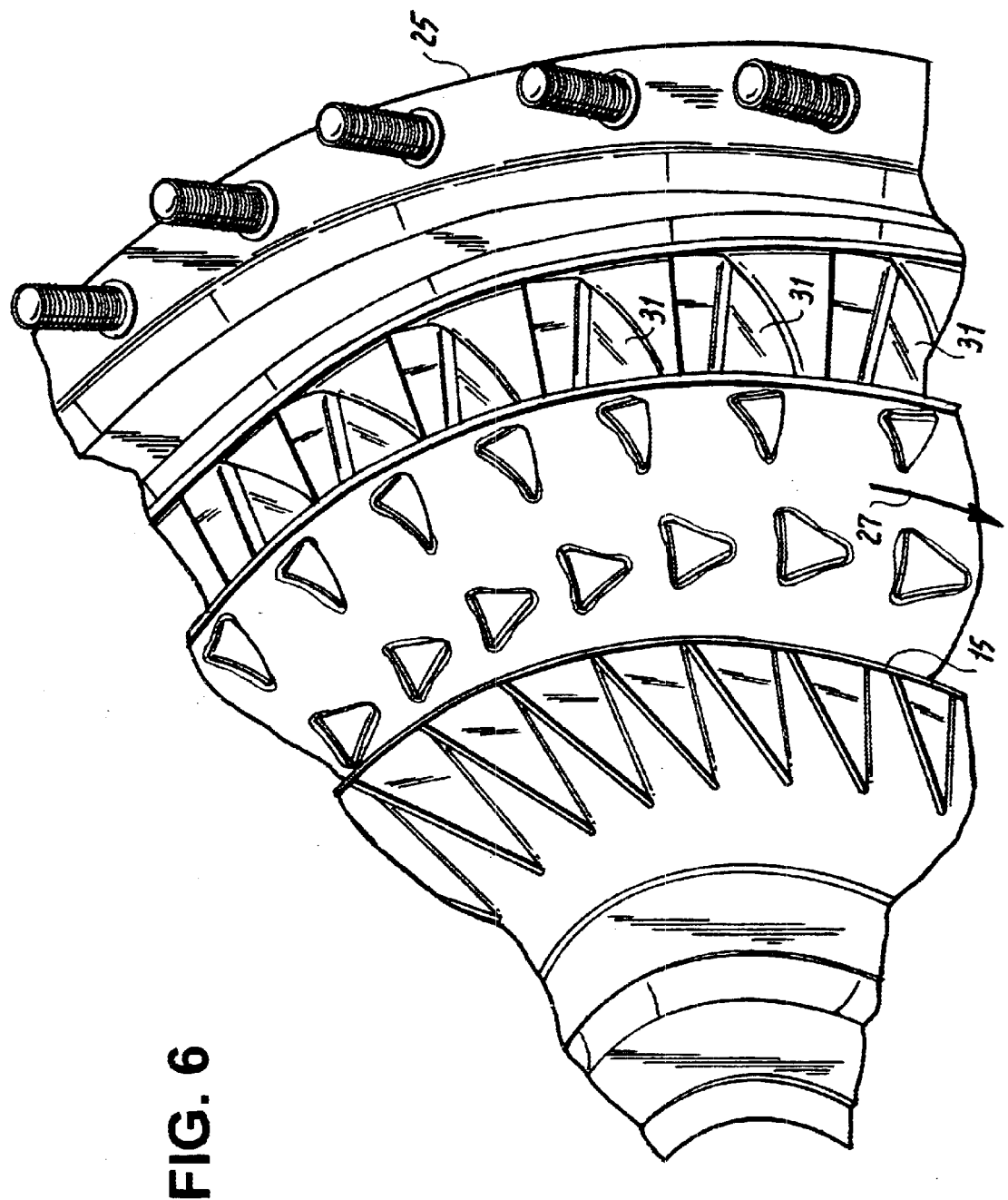
FIG. 6 is a Perspective top view of a modified impeller of this invention.

This modification can be seen more clearly in the enlarged detailed views of FIG. 5 (before modification) and FIG. 6 (after modification); these views also show more of impeller 15 structure. This modification alone is not optimal, however, because it reduces efficiency and increases the temperature of oil in torque converter 4. A second modification is used to control flow within torque converter 4 so as to put its peak efficiency curve right at the desired engine speed for sweeping.

Figure 7:
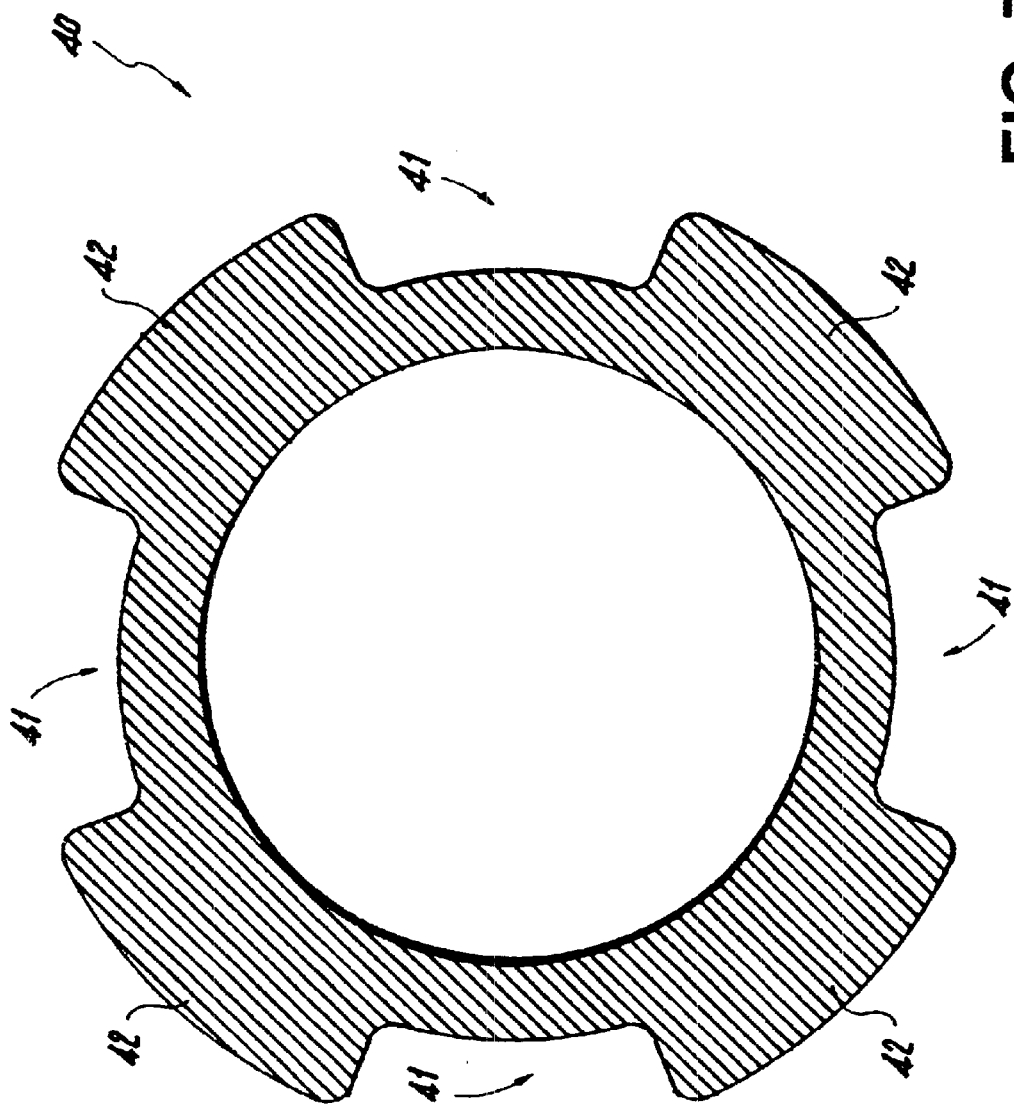
FIG. 7 is a Top plan view of stator baffle plate of this invention.

FIG. 7 shows baffle plate 40 which is welded to stator 17 to further reduce oil velocity and flow. The combination of both modifications achieves the desired results at low cost, no added maintenance, and no added operator training. Oil is blocked by wing sections 42 and must flow through openings 41 to impinge on stator 17 blades.

Figure 8:
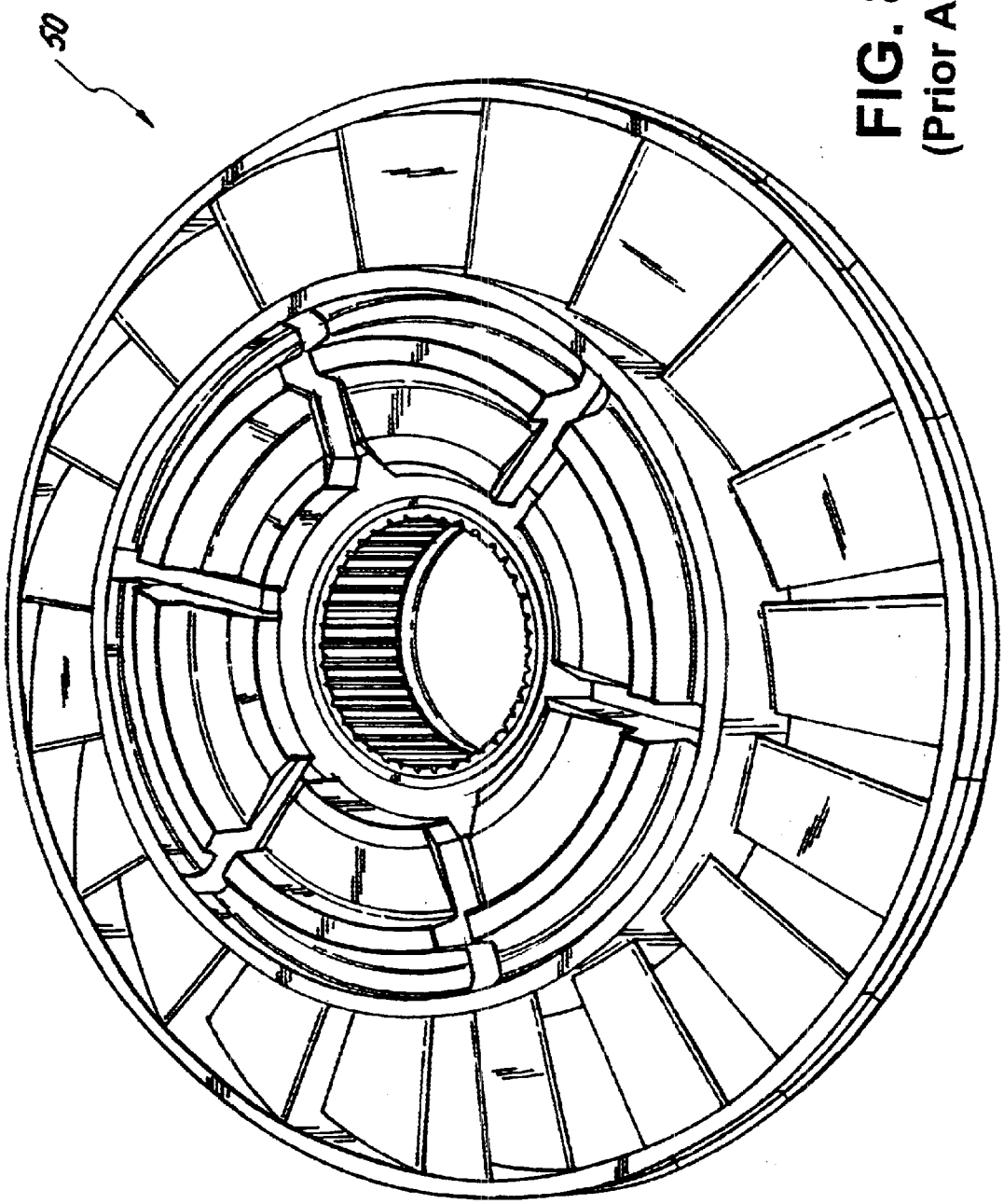
FIG. 8 is a Perspective view of a conventional prior art torque converter stator; and, FIG. 9 is a Perspective view of a stator fitted with the baffle plate of this invention.

FIG. 8 shows a standard stator wheel 50 before modification.

Figure 9:
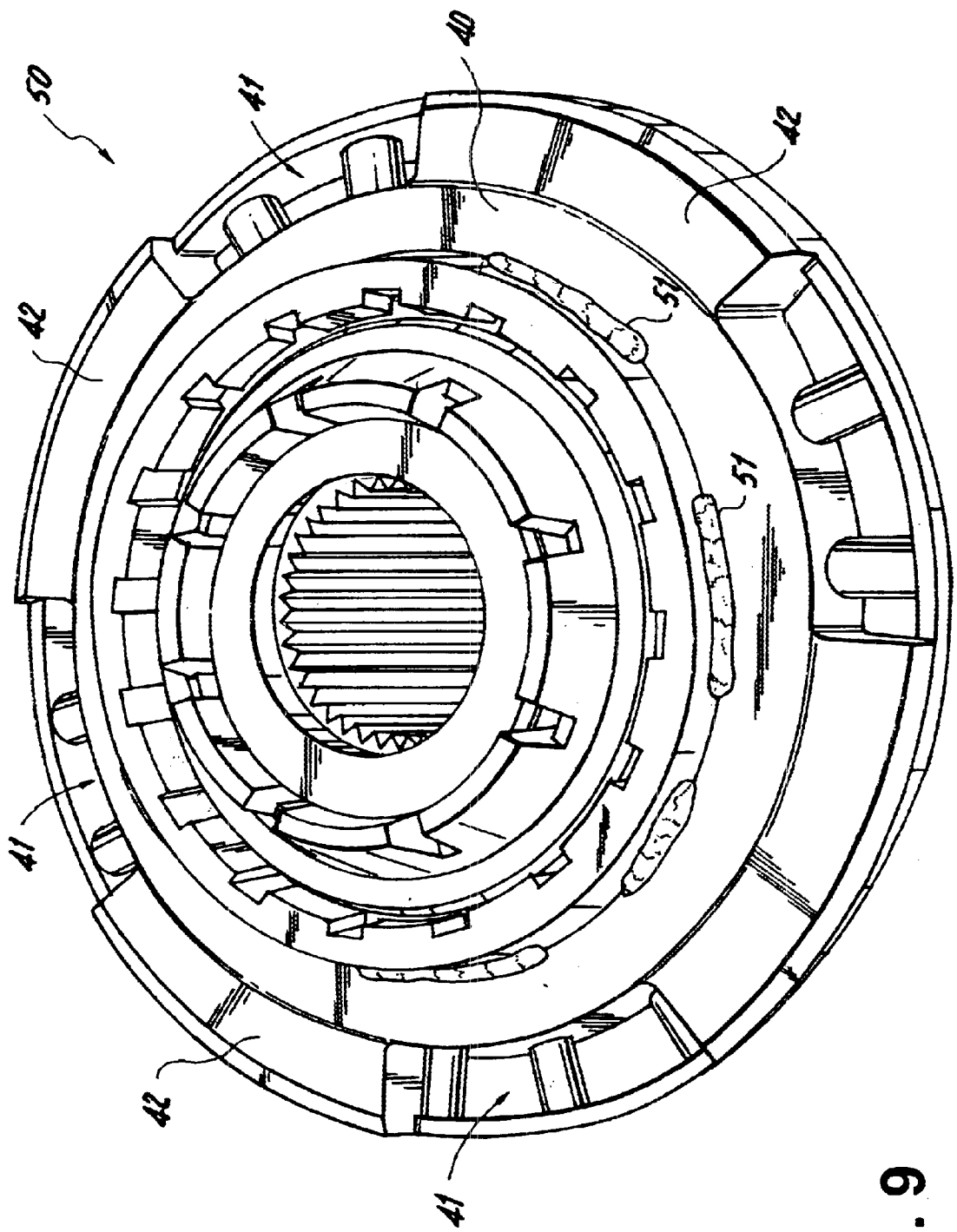

FIG. 9 shows a stator wheel 50 with attached baffle plate 40 which is welded 51 at several locations.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

We claim:

1. A stall converter for a single engine sweeper vehicle having an engine and wheels for propelling said sweeper vehicle forward, said sweeper vehicle further having an auxiliary hydraulic system, said street sweeper vehicle having rotating brushes and fans powered by said auxiliary hydraulic system for gathering and collecting sand and other road debris, said sweeper vehicle having a torque converter, said torque converter including an impeller driven by said engine, a stator redirecting transmission fluid flow pressurized by said impeller and a turbine driven by said transmission fluid flow for driving an automatic transmission of said sweeping vehicle, said automatic transmission driving said wheels of said sweeper vehicle, and wherein the engine drives a hydraulic pump powering the rotating brushes and fans at a high rotational speed while moving the sweeper vehicle in a forward propulsion at predetermined fast and slow speeds, said stall converter comprising:

said torque converter of the street sweeper vehicle having modified internal fluid flow directional blade vanes therein, said modified blade vanes modifying flow of said transmission fluid through said torque converter, said modified fluid flow causing the vehicle's lock-up stall pressure to occur at higher revolutions per minute (RPM's) than a predetermined normal revolutions per minute (RPM's), thereby increasing a first predetermined horsepower and torque output of the engine for driving said rotating brushes and fans while propelling the vehicle at a predetermined speed low for sweeping a surface.

2. The stall converter as in claim 1 wherein said modified blade vanes are oriented with respective curved distal ends thereof facing against a predetermined flow of said fluid through said torque converter.

3. The stall converter as in claim 2 wherein said modified blade vanes are positioned radially extending within said torque converter and wherein said predetermined fluid flow is in a rotational direction opposite to a direction in which said curved distal ends of said modified blade vanes face into.

4. The stall converter as in claim 1 wherein a baffle plate partially blocks said fluid flow to said stator to increase the maximum engine speed at which said turbine can be held stationary, thereby causing said torque converter to slip and slow power to said transmission propelling the vehicle forward, while said engine operates at an engine speed adequately driving said hydraulic pump for powering said brushes and fans.

5. The stall converter as in claim 1 wherein said turbine spins at a slower speed than said engine, while driving an input of said transmission.

6. The stall converter as in claim 3 wherein said modified blade vanes are impeller blades within said impeller of said torque converter, and wherein said modified vanes interrupt said fluid flow therethrough by being angled and re-curved so that respective blade tips of said impeller blades face opposite the predetermined rotation of said impeller of said torque converter, thus reducing fluid velocity and fluid flow reacting on said turbine, thereby reducing torque transferred, and increasing stall torque ratio of said torque converter.

7. A single engine sweeper vehicle in combination with a stall converter comprising:

a motor-driven body having an engine and wheels for propelling said sweeper vehicle forward, said sweeper vehicle further having an auxiliary hydraulic system, said street sweeper vehicle having rotating brushes and fans powered by said auxiliary hydraulic system for gathering and collecting sand and other road debris, said single engine sweeper vehicle having a torque converter, said torque converter including an impeller driven by said engine, a stator redirecting transmission fluid flow pressurized by said impeller and a turbine driven by said transmission fluid flow for driving an automatic transmission of said sweeping vehicle, said automatic transmission driving said wheels of said single engine sweeper vehicle, wherein said engine drives a hydraulic pump powering said rotating brushes and fans at a high rotational speed while moving said wheels of said single engine sweeper vehicle in a forward propulsion at predetermined fast or slow speeds, said stall converter comprising said torque converter of said single engine sweeper vehicle having modified internal fluid flow directional vanes therein, said modified vanes modifying flow of said transmission fluid through said torque converter, said modified fluid flow causing said vehicle's lock-up stall pressure to occur at higher revolutions per minute (RPM's) than a predetermined normal revolutions per minute (RPM's), thereby increasing a first predetermined horsepower and torque output of said engine for driving said rotating brushes and fans while propelling said single engine sweeper vehicle at a predetermined speed low for sweeping a surface.

8. The single engine sweeper vehicle as in claim 7 wherein said modified blade vanes of said stall converter are oriented with respective distal ends thereof facing against a predetermined flow of said fluid through said torque converter.

9. The single engine sweeper vehicle as in claim 7 wherein said modified blade vanes are positioned radially extending within said torque converter and wherein said predetermined fluid flow is in a rotational direction opposite to a direction in which said curved distal ends of said modified blade vanes face into.

10. The single engine sweeper vehicle as in claim 7 wherein a baffle plate partially blocks said fluid flow to said stator to increase the maximum engine speed at which said turbine can be held stationary, thereby causing said torque converter to slip and slow power to said transmission propelling the vehicle forward, while said engine operates at an engine speed adequately driving said hydraulic pump for powering said brushes and fans.

11. The single engine sweeper vehicle as in claim 7 wherein said turbine of said stall converter spins at a slower speed than said engine, while driving an input of said transmission.

12. The single engine sweeper vehicle as in claim 9 wherein said modified blade vanes are impeller blade vanes within said impeller of said torque converter; and wherein said modified blade vanes interrupt fluid flow therethrough by being angled and re-curved so that the respective blade tips of said impeller blade vanes face opposite the predetermined rotation of said impeller of said torque converter, thus reducing fluid velocity and fluid flow reacting on said turbine, thereby reducing torque transferred, and increasing stall torque ratio of said torque converter.

* * * * *